Oct. 28, 1924.
C. O. JORENBY
1,512,987
COMBINED FEEDING RACK AND TROUGH
Filed July 3, 1923
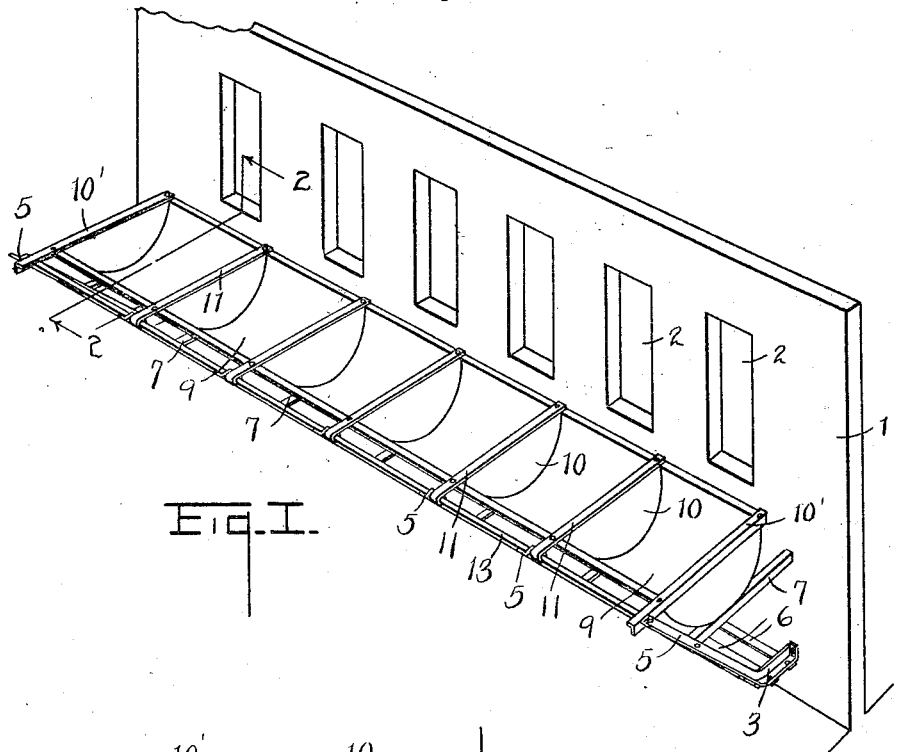
Fig. I.
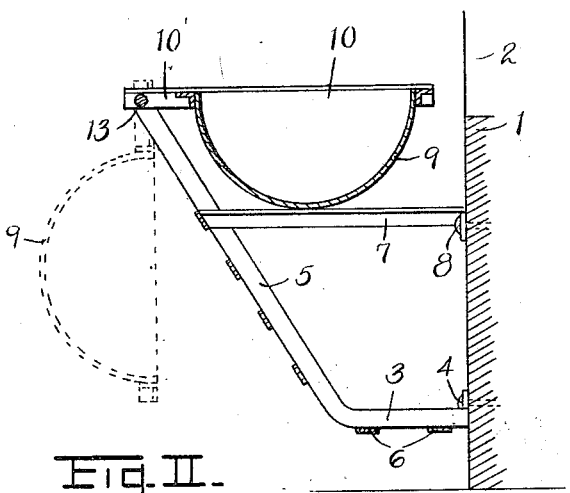
Fig. II.
Inventor
Carl O. Jorenby
By Chappell Earl
Attorneys Patented Oct. 28, 1924.

1,512,987

UNITED STATES PATENT OFFICE.

CARL O. JORENBY, OF GREENWOOD, WISCONSIN.

COMBINED FEEDING RACK AND TROUGH.

Application filed July 3, 1923. Serial No. 649,247.

*To all whom it may concern:*

Be it known that I, CARL O. JORENBY, a citizen of the United States, residing at Greenwood, county of Clark, State of Wisconsin, have invented certain new and useful Improvements in Combined Feeding Racks and Troughs, of which the following is a specification.

This invention relates to improvements in combined feeding racks and troughs.

The main object of the invention is to provide an improved combined feeding rack and trough for calves and the like which is strong and durable in structure although simple and economical in its parts; also one which is very easy to adjust to present the trough for use or the rack.

Further objects, and relating to structural details, will definitely appear from the detailed description to follow.

I accomplish the objects of my invention by the devices and means described in the following specification. The invention is clearly defined and pointed out in the drawings.

A structure which is a preferred embodiment of my invention is clearly illustrated in the accompanying drawing, forming a part of this application, in which:

Fig. I is a rear perspective view of a structure embodying the features of my invention, the trough being shown in operative position.

Fig. II is a vertical section on a line corresponding to line 2—2 of Fig. I with the trough shown in full lines in operative position and by dotted lines in inoperative or collapsed position.

In the drawing similar reference characters refer to similar parts in both views.

Referring to the drawing, 1 represents a supporting wall which, in the structure illustrated, is the wall of a pen and is provided with openings 2 through which the animals may reach the rack and trough. My improved rack comprises a plurality of angled transverse rack bars 3 secured at their inner ends to the wall 1, as by means of the screws or bolts 4. The upright portions of these rack members are inclined forwardly. These are preferably made of angle iron. The longitudinal slats 6 are secured to these members 3 properly spaced to retain the hay or other fodder.

The members 3 are further supported by the cross pieces 7 which are secured by the bolts 8 to the walls, their outer ends being secured to the inclined portions 5 of the members 3. These cross members are disposed in a spaced relation to the upper ends of the members 3 providing rests for the trough 9 as well as braces or supports for the members 3. The trough 9 is provided with a plurality of partitions 10 dividing it into compartments. Above these partitions are cross pieces 11 extended into pivot arms 12. The end cross pieces 10' of the trough are preferably of angle iron. These extending pivot arms are engaged with the pivot rod 13 which is mounted on the upper ends of the rack bars 3, so that the trough may be swung to operative position resting upon the cross pieces 7 of the rack or swung down at the side of the rack as shown by dotted lines in Fig. II.

My improved rack is simple and economical in its parts, is very strong and rigid and convenient to use.

Having thus described my invention, what I claim as new and desire to secure by Letters Patent, is:

1. In a combined rack and feeding trough, the combination with a supporting wall, of a plurality of angled transverse rack bars mounted at their inner ends on said wall, the outer ends of said bars being outwardly inclined, cross pieces secured at their inner ends to said wall, their outer ends being secured to said transverse rack members in spaced relation to the upper ends thereof, longitudinal slats secured to said transverse rack members, a trough provided with a plurality of partitions and having cross pieces disposed across the top thereof above said partitions and extending rearwardly providing pivot arms, and a pivot rod with which said pivot arms are engaged mounted on the upper ends of said transverse rack members whereby said trough is supported to be swung to erected position within said rack resting upon said cross pieces thereof or suspended in collapsed position at the side of the rack.

2. In a combined rack and feeding trough, the combination with a supporting wall, of a plurality of angled transverse rack bars mounted at their inner ends on said wall, the outer ends of said bars being outwardly inclined, cross pieces secured at their inner ends to said wall, their outer ends being secured to said transverse rack members in spaced relation to the upper ends thereof, longitudinal slats secured to said transverse rack members, and a trough provided with arms mounted on said transverse rack members whereby said trough is supported to be swung to erected position within said rack resting upon said cross pieces thereof or suspended in collapsed position at the side of said rack.

3. In a combined rack and feeding trough, the combination of a rack comprising spaced upright members, cross pieces secured to said upright members in spaced relation to their upper ends, a trough having a plurality of partitions therein providing compartments, cross pieces disposed above said partitions and extended into pivot arms, and a pivot rod on which said pivot arms are mounted carried by the upper ends of said upright members so that the said trough may be suspended in collapsed position at the side of said rack or swung to erected position resting upon said rack cross pieces.

4. In a combined rack and feeding trough, the combination of a rack comprising spaced upright members, cross pieces secured on said upright members in spaced relation to their upper ends, and a trough having a plurality of partitions therein providing compartments pivotally mounted on the upper ends of said upright members so that the said trough may be suspended in collapsed position at the side of said rack or swung to erected position resting upon said rack cross pieces.

5. In a structure of the class described, the combination with a rack, of a trough pivotally mounted at the top of said rack to be swung to a suspended collapsed position at the side of and below the top of the rack or to erected in upwardly facing position within the rack, said rack being provided with rests for said trough when in erected position.

6. In a combined rack and feeding trough, the combination with a rack comprising spaced upright members, and a trough having a plurality of partitions providing compartments pivotally mounted at the upper ends of said uprights so that it may be suspended in collapsed position at the side of and below the top of said rack or swung to erected position within the rack.

7. In a combined rack and feeding trough, the combination with a rack and a trough having a plurality of partitions providing compartments pivotally mounted at the rear edge of said rack so that it may be suspended in collapsed position at the side and below the top of the rack or swung to erected position within the rack.

In witness whereof, I have hereunto set my hand and seal.

CARL O. JORENBY. [L. S.]